United States Patent
Hao et al.

(10) Patent No.: US 10,705,729 B2
(45) Date of Patent: Jul. 7, 2020

(54) TOUCH CONTROL METHOD AND APPARATUS FOR FUNCTION KEY, AND STORAGE MEDIUM

(71) Applicant: Xiaomi Inc., Beijing (CN)

(72) Inventors: Ning Hao, Beijing (CN); Dawei Yang, Beijing (CN); Huanhuan Liu, Beijing (CN)

(73) Assignee: XIAOMI INC., Beijing (CN)

( * ) Notice: Subject to any disclaimer, the term of this patent is extended or adjusted under 35 U.S.C. 154(b) by 505 days.

(21) Appl. No.: 15/364,262

(22) Filed: Nov. 30, 2016

(65) Prior Publication Data

US 2017/0153813 A1    Jun. 1, 2017

(30) Foreign Application Priority Data

Dec. 1, 2015  (CN) .......................... 2015 1 0868366

(51) Int. Cl.
 *G06F 3/0488* (2013.01)
 *H04M 1/02* (2006.01)
 (Continued)

(52) U.S. Cl.
 CPC ........ *G06F 3/04886* (2013.01); *G06F 3/0488* (2013.01); *G06F 3/04842* (2013.01);
 (Continued)

(58) Field of Classification Search
 CPC .. G06F 3/04886; G06F 3/04842; G06F 3/017; G06F 3/0488; H04M 1/0281; H04M 2250/22
 See application file for complete search history.

(56) References Cited

U.S. PATENT DOCUMENTS 8,760,426 B1 *  6/2014  Strand ..................... G09G 5/00
                                                    345/169
8,769,431 B1 *  7/2014  Prasad .................... G06F 3/048
                                                    715/788
(Continued)

FOREIGN PATENT DOCUMENTS

CN        103186329 A    7/2013
CN        103543913 A    1/2014
(Continued)

OTHER PUBLICATIONS

International Search Report for PCT/CN2016/101302.
(Continued)

*Primary Examiner* — Tuyetlien T Tran
(74) *Attorney, Agent, or Firm* — Jun He Law Offices P.C.; James J. Zhu

(57) ABSTRACT

A touch control method and apparatus for a function key, and a storage medium are provided. The touch control method includes: determining a current handheld operation mode of a terminal, the handheld operation mode including at least one of a left hand operation mode, a right hand operation mode and a double hand operation mode; determining an operation area corresponding to the current handheld operation mode, activating a surface touch control function of the operation area and displaying the function key in the operation area; and determining whether a user performs a touch control operation on the function key in the operation area, according to a touch position of the user in the operation area and a position of the function key.

20 Claims, 9 Drawing Sheets

(51) Int. Cl.
  *G06F 3/0484* (2013.01)
  *G06F 3/01* (2006.01)
(52) U.S. Cl.
  CPC ........... H04M 1/0281 (2013.01); *G06F 3/017* (2013.01); *H04M 2250/22* (2013.01)

(56) References Cited

U.S. PATENT DOCUMENTS

| | | | |
|---|---|---|---|
| 2010/0097331 A1* | 4/2010 | Wu | G06F 3/0488 345/173 |
| 2010/0287468 A1* | 11/2010 | Reifman | G06F 3/0482 715/702 |
| 2012/0019858 A1* | 1/2012 | Sato | H04N 1/00344 358/1.15 |
| 2014/0028602 A1* | 1/2014 | Morinaga | G06F 1/1626 345/173 |
| 2014/0055384 A1* | 2/2014 | Cheng | G06F 3/0488 345/173 |
| 2014/0082546 A1* | 3/2014 | Yang | G06F 3/04886 715/773 |
| 2014/0351761 A1* | 11/2014 | Bae | G06F 3/04817 715/835 |
| 2015/0054778 A1* | 2/2015 | Zhao | G06F 3/048 345/174 |
| 2015/0089386 A1* | 3/2015 | Brisebois | G06F 3/0488 715/746 |
| 2015/0121262 A1 | 4/2015 | Yao | |
| 2015/0346994 A1* | 12/2015 | Chanyontpatanakul | G06F 3/04883 715/828 |
| 2016/0117095 A1* | 4/2016 | Choi | G06F 3/04817 345/173 |
| 2016/0210034 A1* | 7/2016 | Zhu | G06F 3/04883 |

FOREIGN PATENT DOCUMENTS

| | | |
|---|---|---|
| CN | 103576958 A | 2/2014 |
| CN | 103970443 A | 8/2014 |
| CN | 104007930 A | 8/2014 |
| CN | 104298462 A | 1/2015 |
| CN | 104536682 A | 4/2015 |
| CN | 104598111 A | 5/2015 |
| CN | 104765560 A | 7/2015 |
| CN | 104915143 A | 9/2015 |
| CN | 105094609 A | 11/2015 |
| CN | 105320357 A | 2/2016 |
| EP | 2876522 A1 | 5/2015 |
| TW | 201128450 A | 8/2011 |

OTHER PUBLICATIONS

English Translation of International Preliminary Report on Patentability dated Jun. 5, 2018 for International Application No. PCT/CN2016/101302.
International Preliminary Report on Patentability dated Jun. 5, 2018 for International Application No. PCT/CN2016/101302.
Extended European Search Report of EP 16201449.2.

* cited by examiner

US 10,705,729 B2

TOUCH CONTROL METHOD AND APPARATUS FOR FUNCTION KEY, AND STORAGE MEDIUM

CROSS REFERENCE RELATED TO APPLICATIONS

This application is based on and claims priority of the Chinese Patent Application No. 201510868366.5, filed on Dec. 1, 2015, which is incorporated herein by reference in its entirety.

TECHNICAL FIELD

The present disclosure is related to the field of communications, and more particularly to a touch control method and apparatus for a function key, and a storage medium.

BACKGROUND

With the popularization of large-screen handset, it becomes very convenient to perform single hand operations on large-screen handsets with single-hand mode user interfaces (UIs). There are two design manners for the three function keys of an Android system. In one manner, they are designed as virtual function keys within the screen. In the other manner, they are designed as physical function keys outside the screen. The virtual function keys within the screen will occupy some display area, while the physical function keys outside the screen do not affect the display interface on the screen.

SUMMARY

Embodiments of the present disclosure provide a touch control method and apparatus for a function key, and a storage medium.

According to a first aspect of embodiments of the present disclosure, there is provided a touch control method for a function key. The touch control method includes: determining a current handheld operation mode of a terminal, the handheld operation mode including at least one of a left hand operation mode, a right hand operation mode and a double hand operation mode; determining an operation area corresponding to the current handheld operation mode, activating a surface touch control function of the operation area and displaying the function key in the operation area, wherein the left hand operation mode corresponds to a left hand operation area, the right hand operation mode corresponds to a right hand operation area, and the double hand operation mode corresponds to a double hand operation area; and determining whether a user performs a touch control operation on the function key in the operation area according to a touch position of the user in the operation area and a position of the function key.

According to a second aspect of embodiments of the present disclosure, there is provided a touch control apparatus for a function key. The touch control apparatus includes: a processor; and a memory storing instructions executable by the processor. The processor is configured to: determine a current handheld operation mode of a terminal, the handheld operation mode including at least one of a left hand operation mode, a right hand operation mode and a double hand operation mode; determine an operation area corresponding to the current handheld operation mode, activate a surface touch control function of the operation area and display the function key in the operation area, wherein the left hand operation mode corresponds to a left hand operation area, the right hand operation mode corresponds to a right hand operation area, and the double hand operation mode corresponds to a double hand operation area; and determine whether a user performs a touch control operation on the function key in the operation area according to a touch position of the user in the operation area and a position of the function key.

According to a third aspect of the embodiments of the present disclosure, there is provided a non-transitory computer-readable storage medium having stored therein instructions that, when executed by a processor of a mobile terminal, causes the mobile terminal to perform a touch control method for a function key. The touch control method includes: determining a current handheld operation mode of a terminal, the handheld operation mode including at least one of a left hand operation mode, a right hand operation mode and a double hand operation mode; determining an operation area corresponding to the current handheld operation mode, activating a surface touch control function of the operation area and displaying the function key in the operation area, wherein the left hand operation mode corresponds to a left hand operation area, the right hand operation mode corresponds to a right hand operation area, and the double hand operation mode corresponds to a double hand operation area; and determining whether a user performs a touch control operation on the function key in the operation area according to a touch position of the user in the operation area and a position of the function key.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

Figure 1:
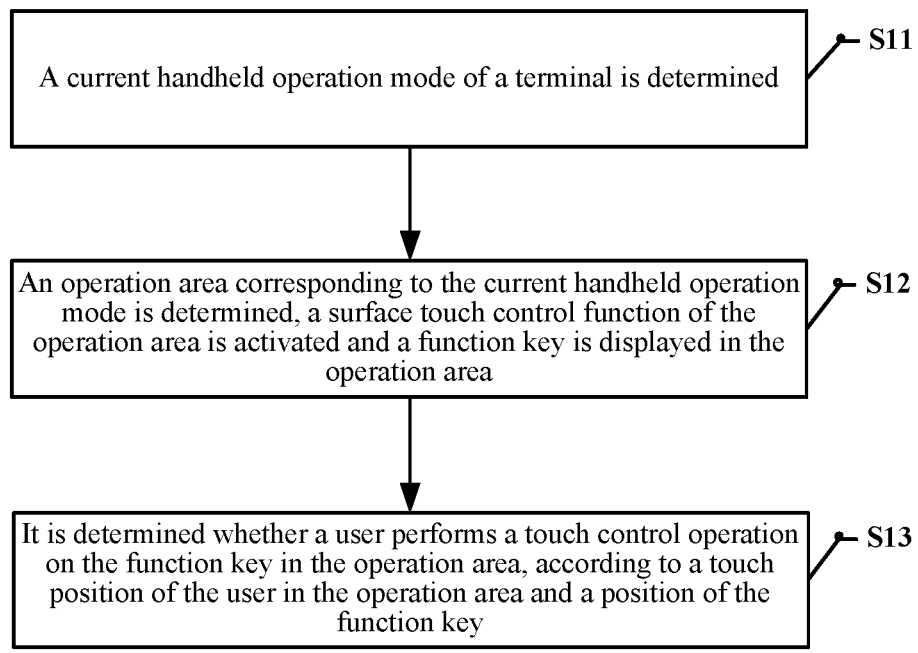
FIG. 1 is a flow chart showing a touch control method for a function key according to an embodiment.

FIG. 1 is a flow chart showing a touch control method for a function key according to an embodiment. The touch control method for a function key is applied in a terminal. The terminal may be a mobile phone, a computer, a digital broadcast terminal, a messaging device, a gaming console, a tablet, a medical device, exercise equipment, a personal digital assistant or the like. As shown in FIG. 1, the touch control method for a function key comprises steps S11-S13.

In step S11, a current handheld operation mode of the terminal is determined, the handheld operation mode including at least one of a left hand operation mode, a right hand operation mode and a double hand operation mode.

In step S12, an operation area corresponding to the current handheld operation mode is determined, a surface touch control function of the operation area is activated and the function key is displayed in the operation area.

The left hand operation mode corresponds to a left hand operation area, the right hand operation mode corresponds to a right hand operation area, and the double hand operation mode corresponds to a double hand operation area. Different handheld operation modes correspond to different operation area positions. That is, positions of the left hand operation area, the right hand operation area, and the double hand operation area on the frame of the terminal are different.

In this step, when the surface touch control function of the determined operation area is activated, surface touch control functions of other operation areas are disabled, and no function key is displayed in these other operation areas.

In step S13, it is determined whether a user performs a touch control operation on the function key in the operation area, according to a touch position of the user in the operation area and a position of the function key.

Figure 2:
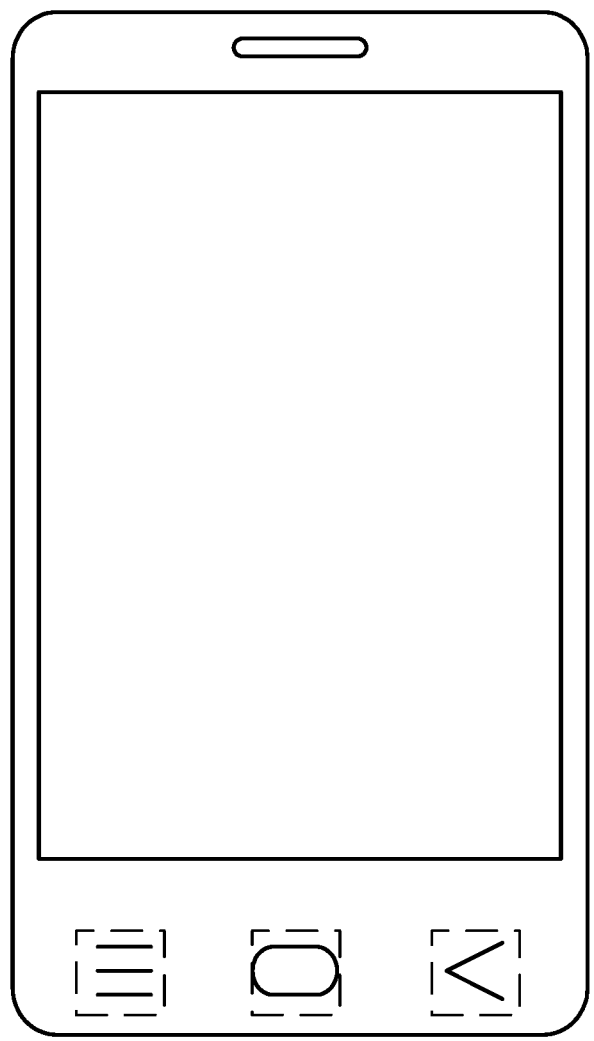
FIG. 2 is a schematic diagram showing function keys involved in a touch control method for a function key according to an embodiment.

Taking an Android phone as example, generally, there are three function keys provided on a lower frame of the Android phone: a menu key, a home key and a return key. At present, default display areas of the three function keys are three points for touch controlling evenly distributed on the lower frame, and the manner for implementing touch controlling of each function key is point touch controlling. As shown in FIG. 2, a user can only operate the function keys at the three points for touch controlling, while the remaining area on the lower frame other than the three points for touch controlling do not contribute to the touch control function.

Figure 3:
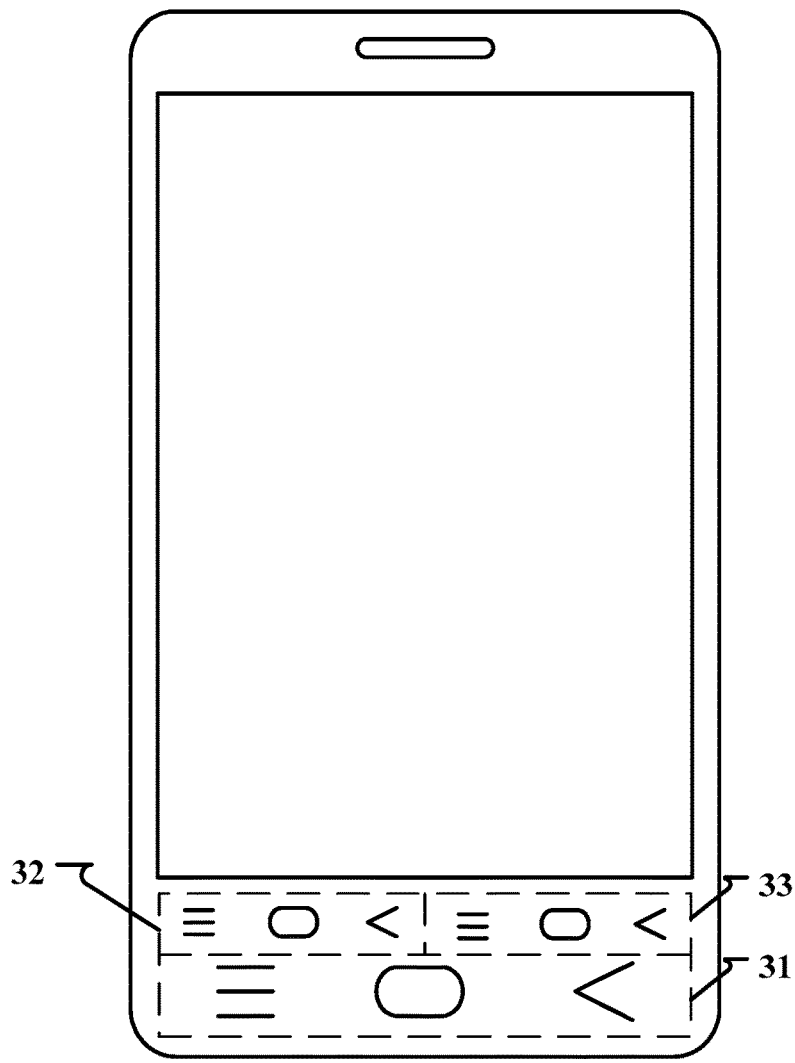
FIG. 3 is a schematic diagram showing function keys involved in a touch control method for a function key according to an embodiment.
Figure 3A:
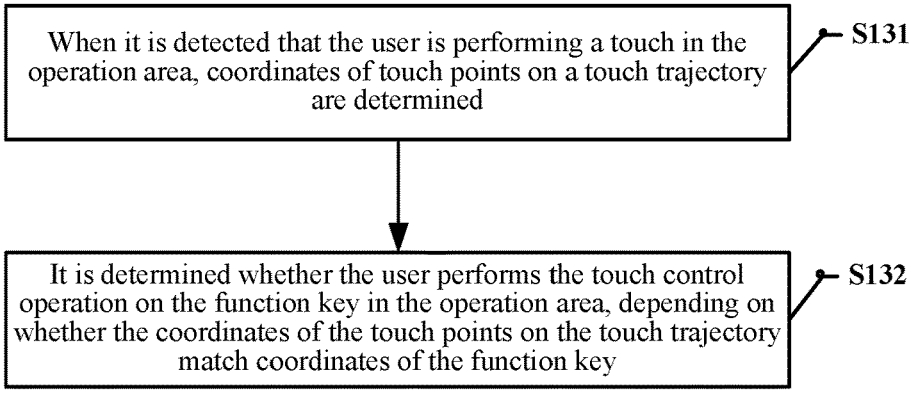
FIG. 3(a) is a flow chart showing step S13 in a touch control method for a function key according to an embodiment.
Figure 3B:
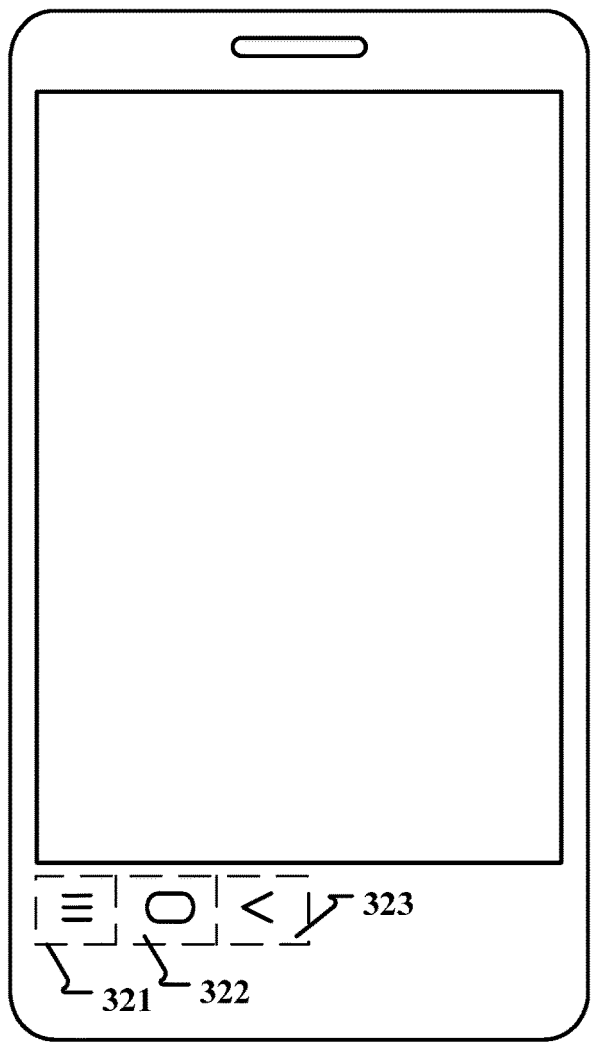
FIG. 3(b) is a schematic diagram showing function keys involved in a touch control method for a function key according to an embodiment.

In this embodiment, operation areas corresponding to handheld operation modes may be set according to operation demands of the user. According to the operation demands of the user, the left hand operation area may be set as a left area on the frame below a screen of the terminal, the right hand operation area may be set as a right area on the frame below the screen of the terminal, and the double hand operation area may be set as a default operation area of the function key. As shown in FIG. 3, the default operation area 31 is suitable for the user to operate with two hands, the left hand operation area 32 is suitable for the user to operate only with the left hand, and the right hand operation area 33 is suitable for the user to operate only with the right hand.

According to a comparison between the function keys and the operation areas shown in FIG. 2 and those shown in FIG. 3 (in FIG. 2 and FIG. 3, areas in dotted frames are the operation areas), only points on a lower frame of a terminal shown in FIG. 2 at which the three function keys are located are operation areas and the remaining area cannot realize the touch control function, while almost the whole area on the lower frame of the terminal shown in FIG. 3 serves as operation areas of the function keys and the whole area is controlled independently from the display screen area by a separate touch control IC (Integrated Circuit). Different from point touch controlling shown in FIG. 2, touch controlling of the function keys shown in FIG. 3 is implemented as surface touch controlling. Thus, the point touch controlling is extended to the surface touch controlling.

With the embodiments of the present disclosure, by determining an operation area through determining a current handheld operation mode of a terminal and by activating a surface touch control function of the operation area, the user can perform a touch control operation in the operation area, in such a manner that the operable area of the function key is no longer a fixed point, but an extended surface area, thereby better catering to the user's operation needs. Thus, compared with a method of implementing touch controlling of a function key at a fixed point, the embodiment above avoids waste of the remaining touchable area, extends point touch controlling of a function key to surface touch controlling thereof, and improves the user experience. In addition, this embodiment does not require addition of further materials on the terminal, and is thus low in cost.

In one embodiment, surface touch controlling of a function key is implemented based on coordinates corresponding to a user's touch trajectory. Therefore, as shown in FIG. 3 (a), step S13 may be implemented by following steps S131 and S132.

In step S131, when it is detected that the user is performing a touch in the operation area, coordinates of touch points on a touch trajectory are determined.

In step S132, it is determined whether the user performs the touch control operation on the function key in the operation area, based on whether the coordinates of the touch points on the touch trajectory match coordinates of the function key.

For example, if it is determined that a current handheld operation mode of the terminal is a left hand operation mode, then an operation area corresponding to the current handheld operation mode is the left hand operation area, which is a left area on the frame below the screen of the terminal as shown in FIG. 3 (b). The terminal displays function keys in the left hand operation area, and activates the surface touch control function of the left hand operation area. In FIG. 3 (b), coordinates in an area 321 framed by dotted lines match those of a menu key; coordinates in an area 322 framed by dotted lines match those of a home key, and coordinates in an area 323 framed by dotted lines match those of a return key. When the user touches in the left hand operation area, the terminal first determines which one of the areas 321, 322 and 323 the coordinates of touch points in the touch trajectory fall in, and then performs a touch control operation based on a matching relation between coordinates of the area in which the coordinates of the touch points fall and coordinates of a function key. When the user touches in the area 321, the terminal performs the menu key function; when the user touches in the area 322, the terminal performs the home key function; and when the user touches in the area 323, the terminal performs the return key function. When the user touches in an area other than the left hand operation area, the terminal does not perform any touch control function.

In this embodiment, by determining whether the user performs the touch control operation on the function key in the operation area based on the coordinates of the touch points on the touch trajectory and the coordinates of the function key, touch controlling of the function key is not limited to be realized at a fixed point. Instead, the touch control function is realized by detecting coordinates in the operation area, thereby extending point touch controlling of a function key to surface touch controlling thereof.

In the above method, a current handheld operation mode of the terminal may be determined in following manners.

Figure 4:
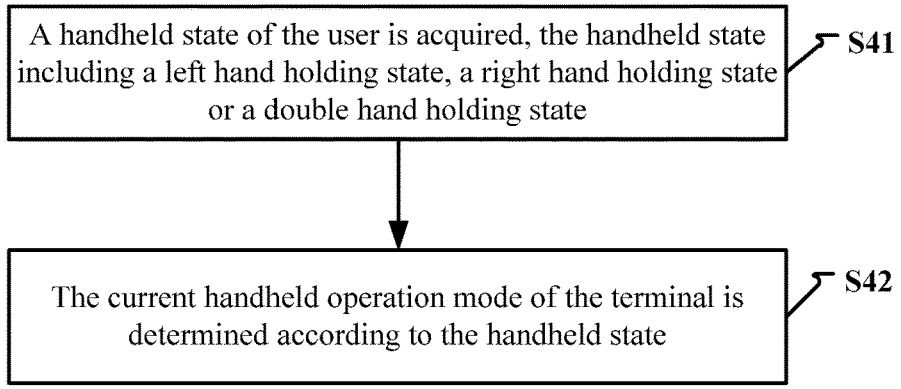
FIG. 4 is a flow chart showing step S11 in a touch control method for a function key according to an embodiment.

In some embodiments, the terminal automatically determines the current handheld operation mode. As shown in FIG. 4, step S11 may be implemented by following steps S41 and S42.

In step S41, a handheld state of the user is acquired, the handheld state including a left hand holding state, a right hand holding state or a double hand holding state.

To implement this step, a light-sensitive device with a light sensing function may be arranged on each of two sides of the terminal. When the user holds the terminal in the left hand, the left hand palm will cover the light-sensitive device on the left side of the terminal, and/or when the user holds the terminal in the right hand, the right hand palm will cover the light-sensitive device on the right side of the terminal, thereby causing light changes in different directions. Therefore, the terminal can determine the current handheld state of the user by the light-sensitive devices on the two sides of the terminal.

In step S42, the current handheld operation mode of the terminal is determined according to the handheld state.

This step may be implemented as follows. If the handheld state is the left hand holding state, it is determined that the current handheld operation mode of the terminal is the left hand operation mode, and then the function key is displayed in the left area on the lower frame of the terminal and the surface touch control function of the left hand operation area is activated. If the handheld state is the right hand holding state, it is determined that the current handheld operation mode of the terminal is the right hand operation mode, and then the function key is displayed in the right area on the lower frame of the terminal and the surface touch control function of the right hand operation area is activated. If the handheld state is the double hand holding state, it is determined that the current handheld operation mode of the terminal is the double hand operation mode, and then the function key is displayed in the default operation area on the lower frame of the terminal and the surface touch control function of the default operation area is activated.

With the embodiment, the terminal can automatically acquire the handheld state of the user, and determine a current handheld operation mode according to the handheld state of the user. Accordingly, the operation area of the function key of the terminal is determined, and meanwhile the surface touch control function of the operation area is activated, so that the operation area of the function key corresponds to the handheld state, thereby catering to user's one-handed operation needs and improving the user experience.

Figure 5:
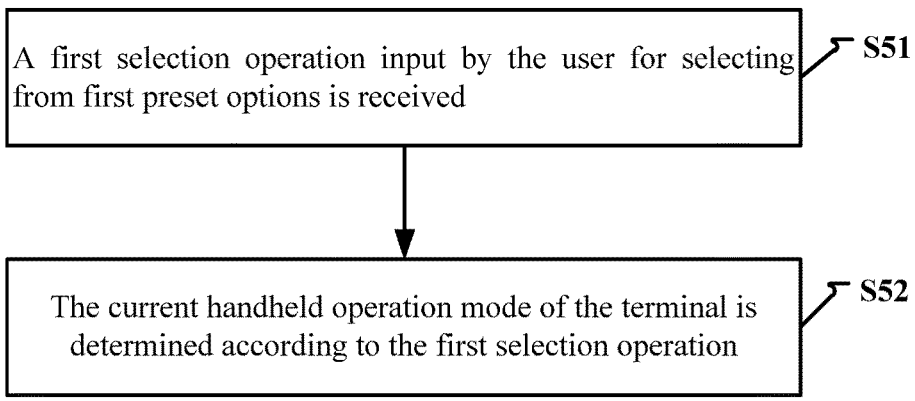
FIG. 5 is a flow chart showing step S11 in a touch control method for a function key according to another embodiment.

In some embodiments, the terminal determines a current handheld operation mode of the terminal according to the user's selection. As shown in FIG. 5, step S11 may be implemented by the following steps S51 and S52.

In step S51, a first selection operation input by the user for selecting from first preset options is received.

In step S52, the current handheld operation mode of the terminal is determined according to the first selection operation, wherein the first preset options include at least one of a left hand operation mode option, a right hand operation mode option and a double hand operation mode option.

When the user selects the left hand operation mode option, the terminal determines that the current handheld operation mode is a left hand operation mode and further determines the operation area of the function key as a left hand operation area. That is, the function key is displayed in the left area on the lower frame of the terminal, and the surface touch control function of the left hand operation area (such as the left hand operation area 32 shown in FIG. 3) is activated. When the user selects the right hand operation mode option, the terminal determines that the current handheld operation mode is a right hand operation mode and further determines the operation area of the function key as a right hand operation area. That is, the function key is displayed in the right area on the lower frame of the terminal, and the surface touch control function of the right hand operation area (such as the right hand operation area 33 shown in FIG. 3) is activated. When the user selects the double hand operation mode option, the terminal determines that the current handheld operation mode is a double hand operation mode and further determines the operation area of the function key as a default operation area. That is, the function key is displayed on the default operation area in the lower frame of the terminal, and the surface touch control function of the default operation area (such as the default operation area 31 shown in FIG. 3) is activated.

With the embodiment, the current handheld operation mode can be determined according to the user's selection operation and the display area of the function key can be determined accordingly, so that the display of the function key can better cater to the user's operation needs, thereby improving the user experience.

Figure 6:
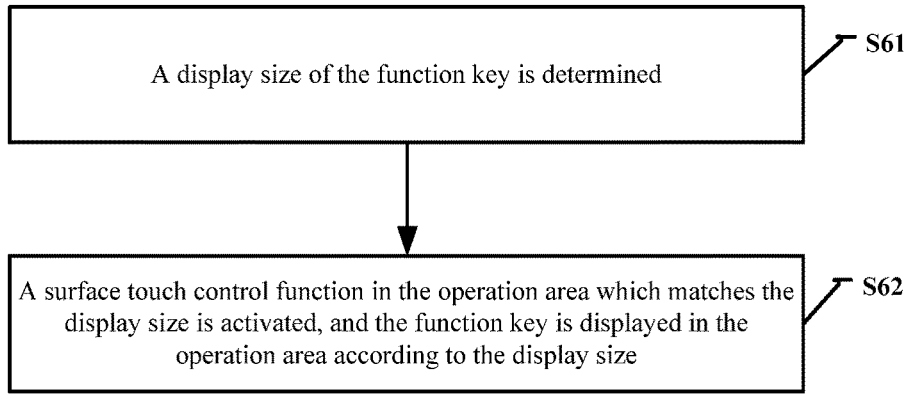
FIG. 6 is a flow chart showing step S12 in a touch control method for a function key according to an embodiment.

In an embodiment, as shown in FIG. 6, step S12 may be implemented by the following steps S61 and S62.

In step S61, a display size of the function key is determined.

In step S62, a surface touch control function in the operation area which matches the display size is activated, and the function key is displayed in the operation area according to the display size.

That is, when the display size of the function key changes, the area corresponding to the activated surface touch control function of the function key also changes, which means that a matching relation between coordinates in the operation area and those of the function key will change. If the display size increases, so does the area corresponding to the surface touch control function of the function key; and if the display size decreases, so does the area corresponding to the surface touch control function of the function key.

In this embodiment, by determining a display size of the function key first, activating a surface touch control function in the operation area which matches the display size, and displaying the function key in the operation area according to the display size, touch controlling of the function key is no longer limited to be realized at a fixed point, but can be adjusted according to different display sizes, so that the operable area of the function key better caters to the user's operation needs.

In the above embodiment, the display size of the function key may be determined in following manners.

Figure 7:
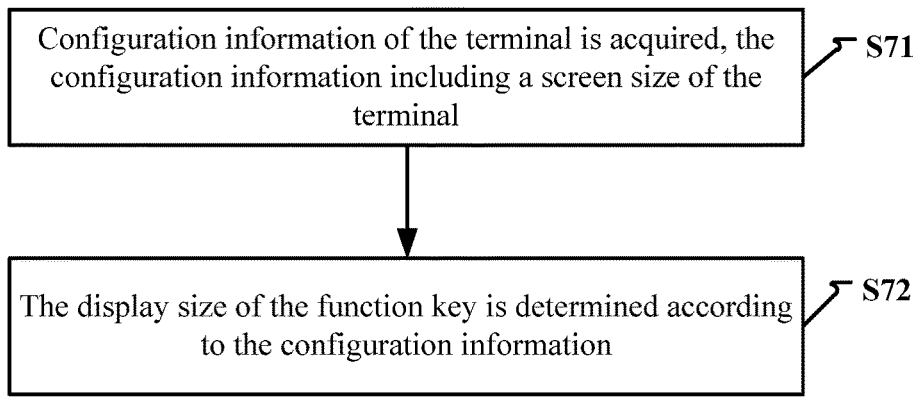
FIG. 7 is a flow chart showing step S61 in a touch control method for a function key according to an embodiment.

In some embodiments, the terminal determines the display size of the function key according to its own screen size. As shown in FIG. 7, step S61 may be implemented by the following steps S71 and S72.

In step S71, configuration information of the terminal is acquired, the configuration information including a screen size of the terminal.

In step S72, the display size of the function key is determined according to the configuration information.

In the embodiment, correspondences between screen sizes of terminals and display sizes of the function key may be preset. The display size of the function key is set to adapt to the screen size of the terminal. The larger the screen size of the terminal is, the greater the display size of the function key is. Thus, with the embodiment, the display size of the function key can be determined according to the screen size of the terminal, and then the function key can be displayed according to the display size thereof, so that the display size of the function key can match the screen size of the terminal. As such, the area where surface touch controlling of the function key is realized can better cater to the user's operation needs.

In some embodiments, the terminal determines the display size of the function key according to the user's selection. Thus, step S61 may be implemented by determining the display size of the function key according to a second selection operation when receiving the second selection operation input by the user for selecting from second preset options, the second preset options including at least two options of different display sizes.

For example, the second preset options comprise a 5-inch option, a 4.7-inch option, a 4-inch option, and the like. Different options indicate different screen sizes of the terminal; and correspondences between screen sizes of the terminal and display sizes of the function key may be preset. The terminal can determine the display size of the function key according to the correspondences between screen sizes of terminals and the display sizes of the function key, after the user selects an option from the second preset options. In addition, the second preset options may also comprise display size options of the function key, specifying lengths and widths of the display area of the function key. When the user selects a different display size, the terminal adjusts the display area of the function key by taking the outer edge of the frame or the center of the display area as a reference.

With the embodiment, the display size of the function key can be determined according to the user's selection, and then the function key can be displayed according to the display size thereof, so that the display size of the function key can be adjusted freely according to the user's selection. As such, the operable area of the function key is no longer limited to a fixed point but extended to a surface area, thereby improving the user's experience with touch controlling of the function key.

In addition, the touch control method for a function key provided by the embodiments of this disclosure is not limited to the above case where the terminal is provided with three function keys, but may be applied to other cases where the terminal is provided with other numbers of function keys.

The followings are apparatus embodiments of the present disclosure, which may be used to perform the method embodiments of the present disclosure.

Figure 8:
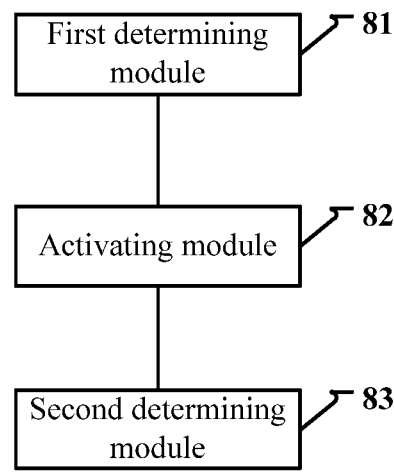
FIG. 8 is a block diagram showing a touch control apparatus for a function key according to an embodiment.
Figure 8A:
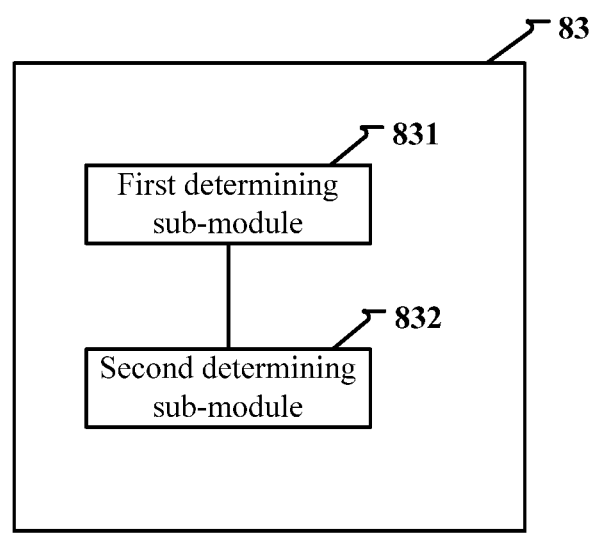
FIG. 8(a) is a block diagram showing a second determining module of a touch control apparatus for a function key according to an embodiment.

FIG. 8 is a block diagram showing a touch control apparatus for a function key according to an embodiment. The apparatus may be realized as a part of or entirety of an electronic device in the form of software, hardware or a combination thereof. As shown in FIG. 8, the touch control apparatus for a function key comprises a first determining module 81, an activating module 82 and a second determining module 83.

The first determining module 81 is configured to determine a current handheld operation mode of a terminal, the handheld operation mode including at least one of a left hand operation mode, a right hand operation mode and a double hand operation mode.

The activating module 82 is configured to determine an operation area corresponding to the current handheld operation mode determined by the first determining module 81, activate a surface touch control function of the operation area and display the function key in the operation area, wherein the left hand operation mode corresponds to a left hand operation area, the right hand operation mode corresponds to a right hand operation area, and the double hand operation mode corresponds to a double hand operation area.

The left hand operation mode corresponds to a left hand operation area, the right hand operation mode corresponds to a right hand operation area, and the double hand operation mode corresponds to a double hand operation area. Different handheld operation modes correspond to different operation area positions. That is, positions of the left hand operation area, the right hand operation area, and the double hand operation area on the frame of the terminal are different.

When the activating module 82 activates the surface touch control function of the determined operation area, surface touch control functions of other operation areas are disabled, and no function key is displayed in these other operation areas.

The second determining module 83 is configured to determine whether a user performs a touch control operation on the function key in the operation area, according to a touch position of the user in the operation area determined by the activating module 82 and a position of the function key.

Taking an Android phone as example, generally, there are three function keys provided on a lower frame of the Android phone: a menu key, a home key and a return key. At present, default display areas of the three function keys are three points for touch controlling evenly distributed on the lower frame, and the manner for implementing touch controlling of each function key is point touch controlling. A user can only operate the function keys at the three points for touch controlling, while the remaining area on the lower frame other than the three points for touch controlling do not contribute to the touch control function.

In this embodiment, operation areas corresponding to handheld operation modes may be set according to operation demands of the user. According to the operation demands of the user, the left hand operation area may be set as a left area on the frame below a screen of the terminal, the right hand operation area may be set as a right area on the frame below the screen of the terminal, and the double hand operation area may be set as a default operation area of the function key. The default operation area is suitable for the user to operate with two hands, the left hand operation area is suitable for the user to operate only with the left hand, and the right hand operation area is suitable for the user to operate only with the right hand.

Therefore, the left hand operation area determined by the first determining module 81 is a left area on the frame below a screen of the terminal, the right hand operation area determined by the first determining module 81 is a right area on the frame below the screen of the terminal, and the double hand operation area determined by the first determining module 81 is a default operation area of the function key. All the operation areas are controlled independently from the display screen area by a separate touch control integrated circuit (IC).

With the above apparatus provided by the embodiment of this disclosure, by determining an operation area through determining a current handheld operation mode of a terminal and by activating a surface touch control function of the operation area, the user can perform a touch control operation in the operation area, in such a manner that the operable area of the function key is no longer a fixed point, but an extended surface area, thereby better catering to the user's operation needs. Thus, compared with a method of implementing touch controlling of a function key at a fixed point, the embodiment above avoids waste of the remaining touchable area, extends point touch controlling of a function key to surface touch controlling thereof, and improves the user experience. In addition, this embodiment does not require addition of further materials on the terminal, and is thus low in cost.

In one embodiment, as shown in FIG. 8(*a*), the second determining module 83 comprises: a first determining sub-module 831 and a second determining sub-module 832.

The first determining sub-module 831 is configured to, when it is detected that the user is performing a touch in the operation area, determine coordinates of touch points on a touch trajectory.

The second determining sub-module 832 is configured to, based on whether the coordinates of the touch points on the touch trajectory determined by the first determining sub-module 831 match coordinates of the function key, determine whether the user performs the touch control operation on the function key in the operation area.

In this embodiment, by determining whether the user performs the touch control operation on the function key in the operation area based on the coordinates of the touch points on the touch trajectory and the coordinates of the function key, touch controlling of the function key is not limited to be realized at a fixed point. Instead, the touch control function is realized by detecting the coordinates in the operation area, thereby extending point touch controlling of a function key to a surface touch controlling thereof.

Figure 9:
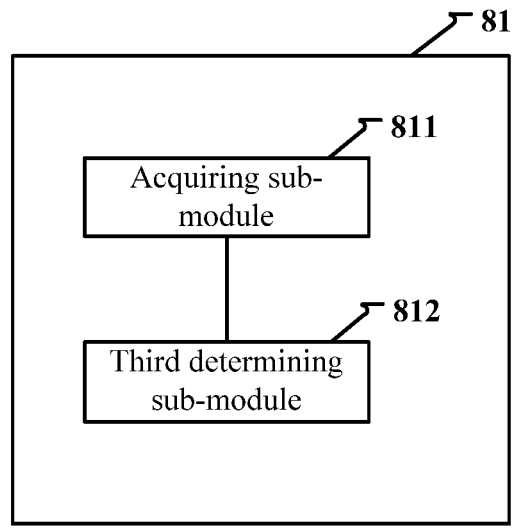
FIG. 9 is a block diagram showing a first determining module of a touch control apparatus for a function key according to an embodiment.

In an embodiment, as shown in FIG. 9, the first determining module 81 comprises: an acquiring sub-module 811 and a third determining sub-module 812.

The acquiring sub-module 811 is configured to acquire a handheld state of the user, the handheld state including a left hand holding state, a right hand holding state or a double hand holding state.

Acquisition of the handheld state of the user by the acquiring sub-module 811 may be realized by arranging a light-sensitive device with a light sensing function on each of two sides of the terminal. When the user holds the terminal in the left hand, the left hand palm will cover the light-sensitive device on the left side of the terminal, and/or when the user holds the terminal in the right hand, the right hand palm will cover the light-sensitive device on the right side of the terminal, thereby causing light changes in different directions. Therefore, the acquiring sub-module 811 can determine the current handheld state of the user by the light-sensitive devices on the two sides of the terminal.

The third determining sub-module 812 is configured to determine the current handheld operation mode of the terminal according to the handheld state acquired by the acquiring sub-module 811.

In an embodiment, the third determining sub-module 812 is configured to, if the handheld state acquired by the acquiring sub-module 811 is the left hand holding state, determine that the current handheld operation mode of the terminal is the left hand operation mode. Then, the function key is displayed in the left area on the lower frame of the terminal, and the surface touch control function of the left hand operation area is activated. In addition, the third determining sub-module 812 may be configured to, if the handheld state acquired by the acquiring sub-module 811 is the right hand holding state, determine that the current handheld operation mode of the terminal is the right hand operation mode. Then, the function key is displayed in the right area on the lower frame of the terminal, and the surface touch control function of the right hand operation area is activated. Furthermore, the third determining sub-module 812 may be configured to, if the handheld state acquired by the acquiring sub-module 811 is the double hand holding state, determine that the current handheld operation mode of the terminal is the double hand operation mode. Then, the function key is displayed in the default operation area on the lower frame of the terminal, and the surface touch control function of the default operation area is activated.

In this embodiment, the handheld state of the user can be acquired automatically by the acquiring sub-module 811. The current handheld operation mode of the terminal can be determined by the third determining sub-module 812 according to the handheld state of the user. Accordingly, the operation area of the function key of the terminal is determined, and meanwhile the surface touch control function of the operation area is activated, so that the operation area of the function key corresponds to the handheld state of the user, thereby catering to user's one-handed operation needs and improving the user experience.

Figure 10:
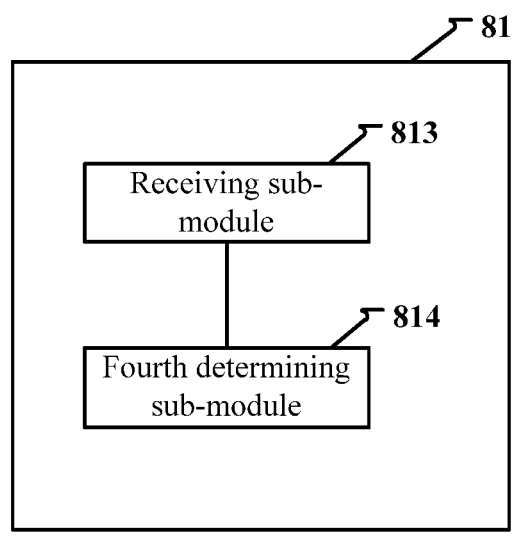
FIG. 10 is a block diagram showing a first determining module of a touch control apparatus for a function key according to another embodiment.

In an embodiment, as shown in FIG. 10, the first determining module 81 comprises: a receiving sub-module 813 and a fourth determining sub-module 814.

The receiving sub-module 813 is configured to receive a first selection operation input by the user for selecting from first preset options.

The fourth determining sub-module 814 is configured to determine the current handheld operation mode of the terminal according to the first selection operation received by the receiving sub-module 813, the first preset options including at least one of a left hand operation mode option, a right hand operation mode option and a double hand operation mode option.

When the left hand operation mode option selected by the user is received by the receiving sub-module 813, the fourth determining sub-module 814 determines that the current handheld operation mode is a left hand operation mode to further determine the operation area of the function key as a left hand operation area. That is, the function key is displayed in the left area on the lower frame of the terminal, and the surface touch control function of the left hand operation area is activated. When the right hand operation mode option selected by the user is received by the receiving sub-module 813, the fourth determining sub-module 814 determines that the current handheld operation mode is a right hand operation mode to further determine the operation area of the function key as a right hand operation area. That is, the function key is displayed in the right area on the lower frame of the terminal, and the surface touch control function of the right hand operation area is activated. When the double hand operation mode option selected by the user is received by the receiving sub-module 813, the fourth determining sub-module 814 determines that the current handheld operation mode is a double hand operation mode to further determine the operation area of the function key as a default operation area. That is, the function key is displayed in the default operation area on the lower frame of the terminal, and the surface touch control function of the default operation hand operation area is activated.

In this embodiment, the current handheld operation mode can be determined by the fourth determining sub-module 814 according to the user's selection operation to further determine the display area of the function key, so that the display of the function key can better cater to the user's operation needs, thereby improving the user experience.

Figure 11:
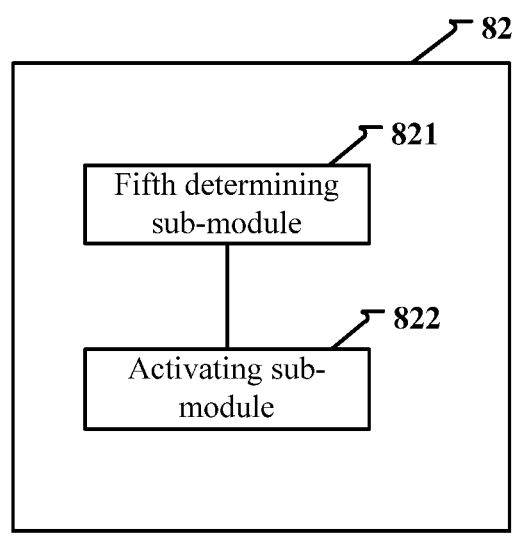
FIG. 11 is a block diagram showing an activating module of a touch control apparatus for a function key according to an embodiment.

In an embodiment, as shown in FIG. 11, the activating module 82 comprises: a fifth determining sub-module 821 and an activating sub-module 822.

The fifth determining sub-module 821 is configured to determine a display size of the function key.

The activating sub-module 822 is configured to activate a surface touch control function in the operation area which matches the display size determined by the fifth determining sub-module 821, and to display the function key in the operation area according to the display size.

That is, when the display size of the function key changes, the area corresponding to the activated surface touch control function of the function key also changes, which means that a matching relation between coordinates in the operation area and those of the function key will change. If the display size increases, so does the area corresponding to the surface touch control function of the function key; and if the display size decreases, so does the area corresponding to the surface touch control function of the function key.

In this embodiment, by determining a display size of the function key first, activating a surface touch control function in the operation area which matches the display size, and displaying the function key in the operation area according to the display size, touch controlling of the function key is no longer limited to be realized at a fixed point, but can be adjusted according to different display sizes, so that the operable area of the function key better caters to the user's operation needs.

In an embodiment, the fifth determining sub-module 821 is configured to: acquire configuration information of the terminal, the configuration information including a screen size of the terminal; and determine the display size of the function key according to the configuration information.

In this embodiment, correspondences between screen sizes of terminals and display sizes of the function key may be preset. The display size of the function key is set to adapt to the screen size of the terminal. The larger the screen size of the terminal is, the greater the display size of the function key is. Thus, the display size of the function key can be determined by the fifth determining sub-module 821 according to the screen size of the terminal, and then the function key can be displayed according to the display size thereof, so that the display size of the function key can match the screen size of the terminal. As such, the area where surface touch controlling of the function key is realized can better cater to the user's operation needs.

In an embodiment, the fifth determining sub-module 821 is configured to, when a second selection operation input by the user for selecting from second preset options is received, determine the display size of the function key according to a second selection operation, the second preset options including at least two options of different display sizes.

For example, the second preset options comprises a 5-inch option, a 4.7-inch option, a 4-inch option, and the like. Different options indicate different screen sizes of the terminal; and correspondences between screen sizes of terminals and display sizes of the function key may be preset. The fifth determining sub-module 821 can determine the display size of the function key according to the correspondences between the screen sizes of terminals and display sizes of the function key after the user selects an option from the second preset options.

In addition, the second preset options may also comprise display size options of the function key, specifying lengths and widths of the display area of the function key. When the user selects a different display size, the terminal adjusts the display area of the function key by taking the outer edge of the frame or the center of the display area as a reference.

In this embodiment, the display size of the function key can be determined by the fifth determining sub-module 821 according to the user's selection, and then the function key can be displayed according to the display size thereof, so that the display size of the function key can be adjusted freely according to the user's selection. As such, the operable area of the function key is no longer limited to a fixed point, but extended to a surface area, thereby improving the user's experience with touch controlling of the function key.

In addition, the touch control apparatus for a function key provided by the embodiments of this disclosure is not limited to the above case where the terminal is provided with three function keys, but may be applied to other cases where the terminal is provided with other numbers of function keys.

In an embodiment, there is provided a touch control apparatus for a function key, comprising: a processor; and a memory storing instructions executable by the processor. The processor is configured to: determine a current handheld operation mode of a terminal, the handheld operation mode including at least one of a left hand operation mode, a right hand operation mode and a double hand operation mode; determine an operation area corresponding to the current handheld operation mode, activate a surface touch control function of the operation area and display the function key in the operation area, wherein the left hand operation mode corresponds to a left hand operation area, the right hand operation mode corresponds to a right hand operation area, and the double hand operation mode corresponds to a double hand operation area; and determine whether a user performs a touch control operation on the function key in the operation area, according to a touch position of the user in the operation area and a position of the function key.

The processor may be further configured such that determining whether the user performs the touch control operation on the function key in the operation area according to the touch position of the user in the operation area and the position of the function key comprises: when detecting that the user is performing a touch in the operation area, determining the coordinates of touch points on a touch trajectory; and based on whether the coordinates of the touch points on the touch trajectory match coordinates of the function key, determining whether the user performs the touch control operation on the function key in the operation area.

The processor may be further configured such that the left hand operation area is a left area on a frame below a screen of the terminal, the right hand operation area is a right area on the frame below the screen of the terminal, and the double hand operation area is a default operation area of the function key.

The processor may be further configured such that determining the current handheld operation mode of the terminal comprises: acquiring a handheld state of the user, the handheld state including a left hand holding state, a right hand holding state or a double hand holding state; and determining the current handheld operation mode of the terminal according to the handheld state, or such that determining the current handheld operation mode of the terminal comprises: receiving a first selection operation input by the user for selecting from first preset options; and determining the current handheld operation mode of the terminal according to the first selection operation, the first preset options including at least one of a left hand operation mode option, a right hand operation mode option and a double hand operation mode option.

The processor may be further configured such that activating the surface touch control function of the operation area and displaying the function key in the operation area comprises: determining a display size of the function key; and activating a surface touch control function in the operation area which matches the display size, and displaying the function key in the operation area according to the display size.

The processor may be further configured such that determining the display size of the function key comprises: acquiring configuration information of the terminal, the configuration information including a screen size of the terminal; and determining the display size of the function key according to the configuration information, or such that determining the display size of the function key comprises: when receiving a second selection operation input by the user for selecting from second preset options, determining the display size of the function key according to the second selection operation, the second preset options including at least two options of different display sizes.

With respect to the apparatuses in the above embodiments, the specific manners for performing operations for individual modules therein have been described in detail in the embodiments regarding the related methods, and will not be elaborated herein.

Figure 12:
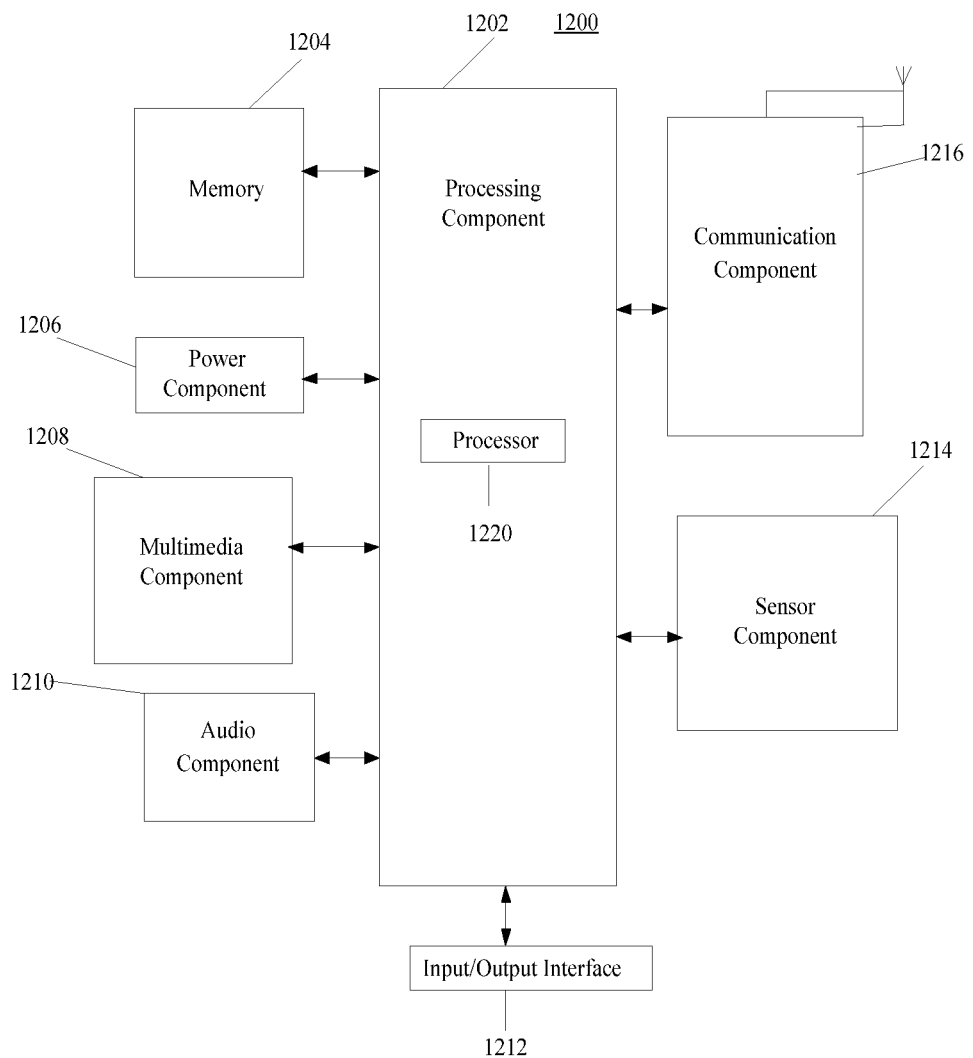
FIG. 12 is a block diagram showing a touch control apparatus for a function key according to another embodiment.

FIG. 12 is a block diagram showing a touch control apparatus 1200 for a function key according to another embodiment. For example, the apparatus 1200 may be a mobile phone, a computer, a digital broadcast terminal, a messaging device, a gaming console, a tablet, a medical device, exercise equipment, a personal digital assistant or the like.

The apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, one or more power sources, and any other components associated with the generation, management, and distribution of power in the apparatus 1200.

The multimedia component 1208 includes a screen providing an output interface between the apparatus 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the apparatus 1200 and other devices. The apparatus 1200 can access a wireless network based on a communication standard, such as WiFi, 2G; or 3G; or a combination thereof. In one embodiment, the communication component 1216 receives a broadcast signal or broadcast associated information from an external broadcast management system via a broadcast channel. In one embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an embodiment, there is also provided a non-transitory computer readable storage medium including instructions, such as included in the memory 1204, executable by the processor 1220 in the apparatus 1200, for performing the above-described methods. For example, the non-transitory-computer-readable storage medium may be a ROM, a RAM, a CD-ROM, a magnetic tape, a floppy disc, an optical data storage device, and the like.

When executed by a processor of the apparatus 1200, instructions stored in the non-transitory computer-readable storage medium cause the apparatus 1200 to perform the above touch control method for a function key. The method comprises: determining a current handheld operation mode of a terminal, the handheld operation mode including at least one of a left hand operation mode, a right hand operation mode and a double hand operation mode; determining an operation area corresponding to the current handheld operation mode, activating a surface touch control function of the operation area and displaying the function key in the operation area, wherein the left hand operation mode corresponds to a left hand operation area, the right hand operation mode corresponds to a right hand operation area, and the double hand operation mode corresponds to a double hand operation area; and determining whether a user performs a touch control operation on the function key in the operation area according to a touch position of the user in the operation area and a position of the function key.

Determining whether the user performs the touch control operation on the function key in the operation area according to the touch position of the user in the operation area and the position of the function key comprises: when detecting that the user is performing a touch in the operation area, determining the coordinates of touch points on a touch trajectory; and based on whether the coordinates of the touch points on the touch trajectory match the coordinates of the function key, determining whether the user performs the touch control operation on the function key in the operation area.

The left hand operation area is a left area on a frame below a screen of the terminal, the right hand operation area is a right area on the frame below the screen of the terminal, and the double hand operation area is a default operation area of the function key.

Determining the current handheld operation mode of the terminal comprises: acquiring a handheld state of the user, the handheld state including a left hand holding state, a right hand holding state or a double hand holding state; and determining the current handheld operation mode of the terminal according to the handheld state, or determining the current handheld operation mode of the terminal comprises: receiving a first selection operation input by the user for selecting from first preset options; and determining the current handheld operation mode of the terminal according to the first selection operation, the first preset options including at least one of a left hand operation mode option, a right hand operation mode option and a double hand operation mode option.

Activating the surface touch control function of the operation area and displaying the function key in the operation area comprises: determining a display size of the function key; and activating a surface touch control function in the operation area which matches the display size, and displaying the function key in the operation area according to the display size.

Determining the display size of the function key comprises: acquiring configuration information of the terminal, the configuration information including a screen size of the terminal; and determining the display size of the function key according to the configuration information, or determining the display size of the function key comprises: when receiving a second selection operation input by the user for selecting from second preset options, determining the display size of the function key according to the second selection operation, the second preset options including at least two options of different display sizes.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A touch control method for a function key, the touch control method comprising:
   determining a current handheld operation mode of a terminal, the handheld operation mode including at least one of a left hand operation mode, a right hand operation mode and a double hand operation mode;

determining an operation area corresponding to the current handheld operation mode, activating a surface touch control function of the operation area and displaying the function key in the operation area, wherein the operation area is independent of a main display area of the terminal and is controlled independently of the main display area, wherein the left hand operation mode corresponds to a left hand operation area, the right hand operation mode corresponds to a right hand operation area, and the double hand operation mode corresponds to a double hand operation area, wherein surface touch control functions of other operation areas are disabled and no function key is displayed in these other operation areas; and determining whether a user performs a touch control operation on the function key in the operation area, according to a touch position of the user in the operation area and a position of the function key.

2. The touch control method of claim 1, wherein determining whether the user performs the touch control operation on the function key in the operation area according to the touch position of the user in the operation area and the position of the function key comprises:

determining coordinates of touch points on a touch trajectory when detecting that the user is performing a touch in the operation area; and determining whether the user performs the touch control operation on the function key in the operation area based on whether the coordinates of the touch points on the touch trajectory match coordinates of the function key.

3. The touch control method of claim 1, wherein the left hand operation area is a left area on a frame below a screen of the terminal, the right hand operation area is a right area on the frame below the screen of the terminal, and the double hand operation area is a default operation area of the function key.

4. The touch control method of claim 1, wherein determining the current handheld operation mode of the terminal comprises:

acquiring a handheld state of the user, the handheld state including a left hand holding state, a right hand holding state or a double hand holding state; and determining the current handheld operation mode of the terminal according to the handheld state.

5. The touch control method of claim 1, wherein determining the current handheld operation mode of the terminal comprises:

receiving a first selection operation input by the user for selecting from first preset options; and determining the current handheld operation mode of the terminal according to the first selection operation, the first preset options including at least one of a left hand operation mode option, a right hand operation mode option and a double hand operation mode option.

6. The touch control method of claim 1, wherein activating the surface touch control function of the operation area and displaying the function key in the operation area comprises:

determining a display size of the function key; and activating a surface touch control function in the operation area which matches the display size, and displaying the function key in the operation area according to the display size.

7. The touch control method of claim 6, wherein determining the display size of the function key comprises:

acquiring configuration information of the terminal, the configuration information including a screen size of the terminal; and determining the display size of the function key according to the configuration information.

8. The touch control method of claim 6, wherein determining the display size of the function key comprises:

determining the display size of the function key according to a second selection operation input by the user for selecting from second preset options when receiving the second selection operation, the second preset options including at least two options of different display sizes.

9. A touch control apparatus for a function key, the touch control apparatus comprising:

a processor; and a memory storing instructions executable by the processor, wherein the processor is configured to:

determine a current handheld operation mode of a terminal, the handheld operation mode including at least one of a left hand operation mode, a right hand operation mode and a double hand operation mode;

determine an operation area corresponding to the current handheld operation mode, activate a surface touch control function of the operation area and display the function key in the operation area, wherein the operation area is independent of a main display area of the terminal and is controlled independently of the main display area, wherein the left hand operation mode corresponds to a left hand operation area, the right hand operation mode corresponds to a right hand operation area, and the double hand operation mode corresponds to a double hand operation area, wherein surface touch control functions of other operation areas are disabled and no function key is displayed in these other operation areas; and determine whether a user performs a touch control operation on the function key in the operation area, according to a touch position of the user in the operation area and a position of the function key.

10. The touch control apparatus according to claim 9, wherein the processor configured to determine whether the user performs the touch control operation on the function key in the operation area according to the touch position of the user in the operation area and the position of the function key is further configured to:

determine coordinates of touch points on a touch trajectory when detecting that the user is performing a touch in the operation area; and determine whether the user performs the touch control operation on the function key in the operation area based on whether the coordinates of the touch points on the touch trajectory match coordinates of the function key.

11. The touch control apparatus according to claim 9, wherein the left hand operation area is a left area on a frame below a screen of the terminal, the right hand operation area is a right area on the frame below the screen of the terminal, and the double hand operation area is a default operation area of the function key.

12. The touch control apparatus according to claim 9, wherein the processor configured to determine the current handheld operation mode of the terminal is further configured to:

acquire a handheld state of the user, the handheld state including a left hand holding state, a right hand holding state or a double hand holding state; and determine the current handheld operation mode of the terminal according to the handheld state.

13. The touch control apparatus according to claim 9, wherein the processor configured to determine the current handheld operation mode of the terminal is further configured to:

receive a first selection operation input by the user for selecting from first preset options; and determine the current handheld operation mode of the terminal according to the first selection operation, the first preset options including at least one of a left hand operation mode option, a right hand operation mode option and a double hand operation mode option.

14. The touch control apparatus according to claim 9, wherein the processor configured to activate the surface touch control function of the operation area and display the function key in the operation area is further configured to:

determine a display size of the function key; and activate a surface touch control function in the operation area which matches the display size, and display the function key in the operation area according to the display size.

15. The touch control apparatus according to claim 14, wherein the processor configured to determine the display size of the function key is further configured to:

acquire configuration information of the terminal, the configuration information including a screen size of the terminal; and determining the display size of the function key according to the configuration information.

16. The touch control apparatus according to claim 14, wherein the processor configured to determine the display size of the function key is further configured to:

determine the display size of the function key according to a second selection operation input by the user for selecting from second preset options when receiving the second selection operation, the second preset options including at least two options of different display sizes.

17. A non-transitory computer-readable storage medium having stored therein instructions that, when executed by a processor of a mobile terminal, causes the mobile terminal to perform a touch control method for a function key, the touch control method comprising:

determining a current handheld operation mode of a terminal, the handheld operation mode including at least one of a left hand operation mode, a right hand operation mode and a double hand operation mode;

determining an operation area corresponding to the current handheld operation mode, activating a surface touch control function of the operation area and displaying the function key in the operation area, wherein the operation area is independent of a main display area of the terminal and is controlled independently of the main display area, wherein the left hand operation mode corresponds to a left hand operation area, the right hand operation mode corresponds to a right hand operation area, and the double hand operation mode corresponds to a double hand operation area, wherein surface touch control functions of other operation areas are disabled and no function key is displayed in these other operation areas; and determining whether a user performs a touch control operation on the function key in the operation area according to a touch position of the user in the operation area and a position of the function key.

18. The storage medium according to claim 17, wherein determining whether the user performs the touch control operation on the function key in the operation area according to the touch position of the user in the operation area and the position of the function key comprises:

determining coordinates of touch points on a touch trajectory when detecting that the user is performing a touch in the operation area; and determining whether the user performs the touch control operation on the function key in the operation area based on whether the coordinates of the touch points on the touch trajectory match coordinates of the function key.

19. The storage medium according to claim 17, wherein the left hand operation area is a left area on a frame below a screen of the terminal, the right hand operation area is a right area on the frame below the screen of the terminal, and the double hand operation area is a default operation area of the function key.

20. The storage medium according to claim 17, wherein activating the surface touch control function of the operation area and displaying the function key in the operation area comprises:

determining a display size of the function key; and activating a surface touch control function in the operation area which matches the display size, and displaying the function key in the operation area according to the display size.

\* \* \* \* \*